Patented Sept. 13, 1938

2,129,881

UNITED STATES PATENT OFFICE 2,129,881

METHOD OF MAKING A COATING FOR ICE CREAM BARS

Adolf Anton Schildberger, New York, N. Y., assignor, by mesne assignments, to Corn Products Refining Company, New York, N. Y., a corporation of New Jersey No Drawing. Application April 29, 1935, Serial No. 18,877. Renewed January 3, 1938

2 Claims. (Cl. 99—134)

This invention relates to the coating of ice cream bars, by which is intended bodies of ice cream of any and all shapes; and the object of the invention is to provide a fondant-like coating for ice cream bars, composed primarily of sugar; which coating can be given any flavoring and any coloring, if desired; which when in contact with and at the temperature of ice cream will retain its fondant-like character, that is to say will be dry and not sticky and will be crisp and tender, not hard or liable to crack; which will adhere to the ice cream; and which will not bloom. Bloom is a light colored efflorescence which is likely to appear on certain confections under some conditions. In order that the coating shall be capable of being flavored with different and especially with delicate flavors, it is important that the compound itself, without the selected flavor, be not too sweet and have no pronounced flavor of its own.

These objects of the invention are accomplished by compounding, in the manner to be described, or by some equivalent method, the following ingredients in the proportions indicated by the given quantities:

High purity dextrose (Cerelose which is a dextrose hydrate), 80 pounds

Water, 8 quarts (before cooking as hereinafter described)

Sucrose, 8 pounds

Starch syrup (43° Baumé corn syrup), 4 pounds

Cocoanut fat or other relatively tasteless fat having a melting point about 92° F., 8 pounds Nougat cream, 5 pounds.

The nougat cream may be composed of dextrose, starch syrup, egg whites and water, compounded as hereinafter described.

The above formula is to be regarded as illustrative and preferential not as limiting the invention to the specific ingredients in the exact proportions given; although to obtain a compound which will have all of the desirable characteristics noted above, it is deemed preferable to employ the formula substantially as given above, and to compound the ingredients substantially in accordance with the method which will be next described.

According to this preferred method the Cerelose and water are cooked to 230° F. to dissolve the Cerelose and provide a solution of the proper density for the crystallizing operation that follows. Any other suitable method may be employed for providing this dextrose solution. The solution, after being cooled to room temperature, is placed in a beater, preferably with two pounds of Cerelose as seed, and beaten until grained to a thick consistency. To this massecuite is added cane sugar and corn syrup, preferably in the amounts given above, the mixture being at a density obtained by cooking to 230° F. and cooling to room temperature. The massecuite is then beaten for about five minutes and the nougat cream added, after which the material is beaten for another five minutes.

The nougat cream is made, preferably in quantities sufficient for making several batches of the coating compound, by cooking together to approximately 238° F. 12½ pounds of Cerelose, 12½ pounds of 43° Baumé corn syrup, and 3 quarts of water. 4¾ pounds of egg whites are placed in a beater and the cooked Cerelose, corn syrup and water mixture added little by little and beaten up with the egg whites. The egg whites give the coating lightness and fluffiness. After the nougat cream has been beaten in with the other ingredients of the coating compound, the fat, preferably cocoanut fat on account of its melting point, neutral flavor and low cost, is thoroughly mixed, in a melted state, into the batch.

The ice cream bars may be coated with the compound by dipping, the compound to have a temperature as near as possible to the temperature of the ice cream. The temperature, however, must not be low enough to so thicken the coating compound as to interfere with proper dipping. A suitable working temperature is about 95° F. For this reason the melting point of the fat should not be substantially higher than 92° F. Contact with the cold ice cream solidifies the coating.

The compound consists principally of a body of very small crystals, substantially all dextrose crystals, containing a small amount of a sugar solution with which the solid phase is in relatively stable equilibrium. That is, the tendency to further crystallization is in a large measure stayed because of the character of the liquid phase which contains in solution sucrose, dextrose and corn syrup. The corn syrup particularly tends to retard crystallization and keep the liquid phase at the right viscosity.

It will be understood that it is the intention to cover all modifications of product and process within the scope of the appended claims. No claim is made herein to any invention common to this application and that of Otto C. Stanger and Alva Thompson for "Coating for low temperature confections", filed January 16, 1936, Serial No. 59,407.

I claim:

1. Process of making a coating for ice cream bars which comprises crystallizing with agitation to a thick consistency a solution of dextrose and water in quantity and at a density obtainable by cooking of 80 pounds of dextrose and 8 quarts of water to approximately 230° F.; beating into the massecuite a mixture of sucrose and starch syrup in quantity and at a density obtainable by cooking 8 pounds of sucrose and 4 pounds of starch syrup at 43° Baumé to approximately 230° F.; beating into the batch 5 pounds of nougat cream; and mixing with the batch 8 pounds of melted cocoanut fat.

2. Process of making a coating for ice cream bars which comprises beating a solution of dextrose and water, in quantity and density obtainable by cooking of 80 pounds of dextrose and 8 quarts of water to approximately 230° F., until the solution is grained to a thick consistency; beating into the massecuite a mixture of sucrose and starch syrup in quantity and at a density obtainable by cooking 8 pounds of sucrose and 4 pounds of starch syrup at 43° Baumé, to approximately 230° F.; beating into the batch 5 pounds of crystallized compound of dextrose, starch syrup and egg whites; and mixing with the batch 8 pounds of melted cocoanut fat.

ADOLF ANTON SCHILDBERGER.